(12) United States Patent
Rowe

(10) Patent No.: US 11,447,607 B2
(45) Date of Patent: Sep. 20, 2022

(54) WOVEN CARBON FIBER REINFORCED STEEL MATRIX COMPOSITE WITH FULLY PENETRATED REINFORCEMENT

(71) Applicant: Toyota Motor Engineering & Manufacturing North America, Inc., Plano, TX (US)

(72) Inventor: Michael Paul Rowe, Pinckney, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 114 days.

(21) Appl. No.: 16/825,187

(22) Filed: Mar. 20, 2020

(65) Prior Publication Data

US 2020/0298528 A1    Sep. 24, 2020

Related U.S. Application Data

(60) Provisional application No. 62/821,762, filed on Mar. 21, 2019.

(51) Int. Cl.
*B32B 5/02* (2006.01)
*B32B 5/16* (2006.01)
(Continued)

(52) U.S. Cl.
CPC ...... *C08J 3/20* (2013.01); *B22F 7/02* (2013.01); *B32B 5/024* (2013.01); *B32B 5/16* (2013.01);
(Continued)

(58) Field of Classification Search
CPC ......... B32B 15/04; B32B 15/14; B32B 15/18; B32B 2262/106
See application file for complete search history.

(56) References Cited

U.S. PATENT DOCUMENTS 4,916,997 A * 4/1990 Spain ................ B22F 3/002
156/148
5,495,979 A * 3/1996 Sastri ................ B22D 19/14
205/103

(Continued)

FOREIGN PATENT DOCUMENTS

CN    101057003 A    10/2007
CN    101314839 B    12/2008
(Continued)

OTHER PUBLICATIONS

Harris, "X. Quantitative Measurement of Preferred Orientation in Rolled Uranium Bars", Sep. 1951, pp. 113-123, pp. 113-123 Ser. 7, vol. 43, No. 336.
(Continued)

*Primary Examiner* — Alicia J Sawdon
(74) *Attorney, Agent, or Firm* — Christopher G. Darrow; Darrow Mustafa PC

(57) ABSTRACT

Composite materials include a steel matrix with reinforcing carbon fiber formed of individual fibers penetrating into the matrix to substantial depth. The fibers typically have defined diameters and large ratios of penetration depth to fiber diameter. Specified methods for forming the composite materials have a unique ability to achieve the large ratios of penetration depth to fiber diameter.

14 Claims, 3 Drawing Sheets

(51) Int. Cl.

| | |
|---|---|
| *B32B 15/04* | (2006.01) |
| *C08J 3/20* | (2006.01) |
| *C08K 3/04* | (2006.01) |
| *C08K 3/08* | (2006.01) |
| *C22C 47/06* | (2006.01) |
| *D06M 11/74* | (2006.01) |
| *B32B 5/24* | (2006.01) |
| *B32B 5/30* | (2006.01) |
| *B32B 7/12* | (2006.01) |
| *B32B 15/18* | (2006.01) |
| *B32B 37/24* | (2006.01) |
| *B22F 7/02* | (2006.01) |
| *B32B 15/14* | (2006.01) |

(52) U.S. Cl.
CPC ............... *B32B 5/24* (2013.01); *B32B 5/30* (2013.01); *B32B 7/12* (2013.01); *B32B 15/04* (2013.01); *B32B 15/043* (2013.01); *B32B 15/18* (2013.01); *B32B 37/24* (2013.01); *C08K 3/04* (2013.01); *C08K 3/08* (2013.01); *C22C 47/06* (2013.01); *D06M 11/74* (2013.01); *B32B 15/14* (2013.01); *B32B 2262/106* (2013.01); *B32B 2264/105* (2013.01); *B32B 2305/80* (2013.01); *B32B 2311/30* (2013.01); *B32B 2605/00* (2013.01); *C08J 2377/10* (2013.01)

(56) References Cited

U.S. PATENT DOCUMENTS

| | | | |
|---|---|---|---|
| 5,814,408 A | 9/1998 | Ting et al. | |
| 5,989,334 A | 11/1999 | Dry | |
| 7,491,356 B2 | 2/2009 | Heikkila | |
| 7,785,392 B2 | 8/2010 | Shim et al. | |
| 7,927,507 B1 | 4/2011 | Li et al. | |
| 8,192,866 B2 | 6/2012 | Golightly et al. | |
| 8,361,651 B2 | 1/2013 | Matsui | |
| 8,372,177 B1 | 2/2013 | Thoma et al. | |
| 8,395,003 B2 | 3/2013 | Leger et al. | |
| 8,980,219 B1 | 3/2015 | Rowe et al. | |
| 9,142,834 B2 | 9/2015 | Mohtadi et al. | |
| 2005/0217427 A1 | 10/2005 | Suthersan et al. | |
| 2007/0104933 A1 | 5/2007 | Saadatmanesh | |
| 2009/0029148 A1 | 1/2009 | Hashimoto et al. | |
| 2009/0090214 A1 | 4/2009 | Cheng | |
| 2009/0264277 A1 | 10/2009 | Raj et al. | |
| 2012/0153216 A1* | 6/2012 | Wrosch ............... | B82Y 30/00 252/74 |
| 2012/0196147 A1 | 8/2012 | Rabiei | |
| 2013/0084502 A1 | 4/2013 | Singh et al. | |
| 2015/0068646 A1 | 3/2015 | Rowe | |
| 2015/0096887 A1 | 4/2015 | McDonald et al. | |
| 2015/0097649 A1 | 4/2015 | Rowe | |
| 2015/0098882 A1 | 4/2015 | Rowe | |
| 2015/0098884 A1 | 4/2015 | Rowe | |
| 2015/0098885 A1 | 4/2015 | Rowe | |
| 2015/0098886 A1 | 4/2015 | Rowe et al. | |
| 2015/0098892 A1 | 4/2015 | Rowe et al. | |
| 2015/0099118 A1 | 4/2015 | Mizuno et al. | |
| 2015/0099135 A1 | 4/2015 | Mohtadi et al. | |
| 2015/0099172 A1 | 4/2015 | Rowe et al. | |
| 2015/0099182 A1 | 4/2015 | Singh et al. | |
| 2015/0099183 A1 | 4/2015 | Singh et al. | |
| 2015/0375478 A1* | 12/2015 | Gruhn ............... | C08G 18/8061 442/286 |
| 2016/0130689 A1* | 5/2016 | Choi ............... | C21D 6/00 148/579 |
| 2016/0199916 A1 | 7/2016 | Rowe et al. | |
| 2016/0200753 A1 | 7/2016 | Rowe et al. | |
| 2018/0079884 A1 | 3/2018 | Rowe | |

FOREIGN PATENT DOCUMENTS

| | | |
|---|---|---|
| CN | 102909381 A | 2/2013 |
| DE | 112012001928 T5 | 2/2014 |
| JP | 62010202 A | 1/1987 |
| JP | 2010186606 A | 8/2010 |
| JP | 2012038697 A | 2/2012 |
| JP | 2013073839 A | 4/2013 |
| JP | 2013131366 A | 7/2013 |
| WO | 2012007830 A1 | 1/2012 |
| WO | 2013056185 A1 | 4/2013 |
| WO | 2013063161 A2 | 5/2013 |

OTHER PUBLICATIONS

Imamura et al., "Dehydriding of Sn/MgH2 nanocomposite formed by ball milling of MgH2 with Sn", Int. J. Hydrogen Energy, Jul. 2007, pp. 4191-4194, vol. 32.
Dang, Z., et al., "Novel Ferroelectric Polymer Composites with High Dielectric Constants," Advanced Materials, Oct. 2003, pp. 1625-1629, vol. No. 19.
Schüth et al., "Light Metal Hydrides and Complex Hydrides for Hydrogen Storage", Chem Commun, Sep. 2004, pp. 2249-2258, Issue 20.
Fu, W., et al., "Preparation and Magnetic Characterization of Core-Shell Structure Stainless Steel/Silica Nanoparticles," Science Direct Materials Letters 60, 2006, pp. 1728-1732.
Varin et al., "The Effects of Ball Milling and Nonmetric Nickel Additive on the Hydrogen Desorption from Lithium Borohydride and Manganese Chloride (3LiBH4+MnCl2) Mixture", 2010, Int. J. Hydrogen Energy, pp. 3588-3597, vol. 35.
Wronski et al., "A New Nanonickel Catalyst for Hydrogen Storage in Solid-state Magnesium Hydrides", 2011, Int. J. Hydrogen Energy, pp. 1159-1166, vol. 36.
Al-Sulaiman, F., et al., "Laser Cutting of Kevlar and Mild Steel Composite Structure: End Product Quality Assessment," Journal of Materials Engineering and Performance, Feb. 2007, pp. 22-29, ASM International, vol. 16(1).
Garrison et al., "Ferrous Alloys: Overview," Encyclopedia of Materials—Science and Technology, vols. 1-11, pp. 3127-3131 Elsevier (2001).
Campbell, F.C., "Structural Composite Materials", Ch. 1: Introduction to Composite Materials, 30 pages (2010).
"Powder Metalurgy—Sintering Temperatures for Some Common Metals", AZO Materials, 2 pages (2002).
"KEVLAR® Aramid Fiber Technical Guide", E.I. du Pont de Nemours and Company, 24 pages (Jul. 2017).
Shirvanimoghaddam, K. et al., "Carbon fiber reinforced metal matrix composites: Fabrication processes and properties", Composites: Part A 92, pp. 70-96 (2017).
Adebisi, A., et al., "Metal Matrix Composite Brake Rotors: Historical Development and Product Life Cycle Analysis," International Journal of Automotive and Mechanical Engineering, 4, pp. 471-480 (2011).
Miracle, D.B., "Metal matrix composites—From science to technological significance," Composites Science and Technology, 65, pp. 2526-2540 (2005).
Brown, J.R. et al., "Thermal Analysis of Nomex® and Kevlar® Fibers," Textile Research Journal, pp. 62-66 (Jan. 1977).
Embury, D. et al., "Steel-Based Composites: Driving Forces and Classifications," Annu. Rev. Mater. Res., 40, pp. 213-241 (2010).
Mortensen, A. et al., "Metal Matrix Composites," Annu. Rev. Mater. Res., 40, pp. 243-270 (2010).

* cited by examiner

WOVEN CARBON FIBER REINFORCED STEEL MATRIX COMPOSITE WITH FULLY PENETRATED REINFORCEMENT

CROSS-REFERENCE TO RELATED APPLICATIONS

This application claims the benefit of U.S. Provisional Application No. 62/821,762, filed Mar. 21, 2019, incorporated herein by reference in its entirety.

TECHNICAL FIELD

The present disclosure generally relates to metal/polymer composite materials and, more particularly, to a lightweight composite of steel and a reinforcing carbon fiber, and method of making the same.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Steel, including various carbon-fortified alloys of iron, possesses excellent strength-to-weight properties that have made it a fixture in a wide variety of high load applications. Yet many modern applications would benefit from extending the strength of steel, tensile or otherwise, while maintaining or even reducing its density. These include automotive applications, where weight/density improvements can yield significant efficiency benefits.

Metal matrix composites can generally afford strength enhancements relative to the base metals, while decreasing density. Steel matrix composites can be difficult to form, because the high melting temperature of steel is incompatible with the decomposition temperature of many matrix materials. Methods that attempt to insert molten reinforcing material into a preformed steel matrix are unsuitable, as the reinforcing material will generally be unable to penetrate the steel matrix to an adequate depth. It will thus be beneficial to present steel matrix composites, and methods for making them, that yield substantial, or even complete, penetration depths of the reinforcing material into the steel matrix.

SUMMARY

This section provides a general summary of the disclosure, and is not a comprehensive disclosure of its full scope or all of its features.

In various aspects, the present teachings provide a composite material having a continuous steel matrix of sintered steel nanoparticles and at least one reinforcing carbon fiber encapsulated within the steel matrix. The at least one reinforcing carbon fiber can be formed of fibers having an average cross-sectional diameter less than about 5 mm. The at least one reinforcing carbon fiber can penetrate the continuous steel matrix to a penetration depth of at least 1 cm and, in many cases, can have a ratio of penetration depth to fiber diameter of 200:1, or greater.

In other aspects, the present teachings provide a composite material. The composite material includes at least structural carbon fiber component, formed of fibers having an average cross-sectional diameter less than about 1 mm, and a continuous steel matrix, of sintered steel nanoparticles, formed around and within the structural carbon fiber component. The fibers of the structural carbon fiber component can penetrate the continuous steel matrix to a penetration depth of at least 1 cm and, in many cases, can have a ratio of penetration depth to fiber diameter of 200:1, or greater.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present disclosure generally relates to composite materials including a steel matrix with a reinforcing carbon fiber integrated into the matrix. The composite materials have a substantially lower density than steel, and have appreciable strength. Methods for forming polymer-steel composites include combining a reinforcing carbon fiber component, such as an aromatic polyamide, with steel nanoparticles and sintering the steel nanoparticles in order to form a steel matrix with a reinforcing carbon fiber integrated therein.

Conventional steel melts at temperatures of greater than about 1200° C. Such high temperatures would instantly destroy various reinforcing carbon fibers on contact, which decomposes at about 450° C. or less. Accordingly, the present technology for forming a steel/polymer composite employs steel nanoparticles, lowering the melting point of steel to less than about 450° C. When combined and heated, this allows for the steel nanoparticles to sinter around the reinforcing carbon fiber component, without destroying the reinforcing carbon fiber component. The result is layer(s) or extending fibers of a reinforcing carbon fiber interpenetrated in a steel matrix.

A composite of the present disclosure can have significantly lower density than conventional steel, as low as 60% in one example. The composite can also provide considerable structural strength, including tensile strength.

Figure 1A:
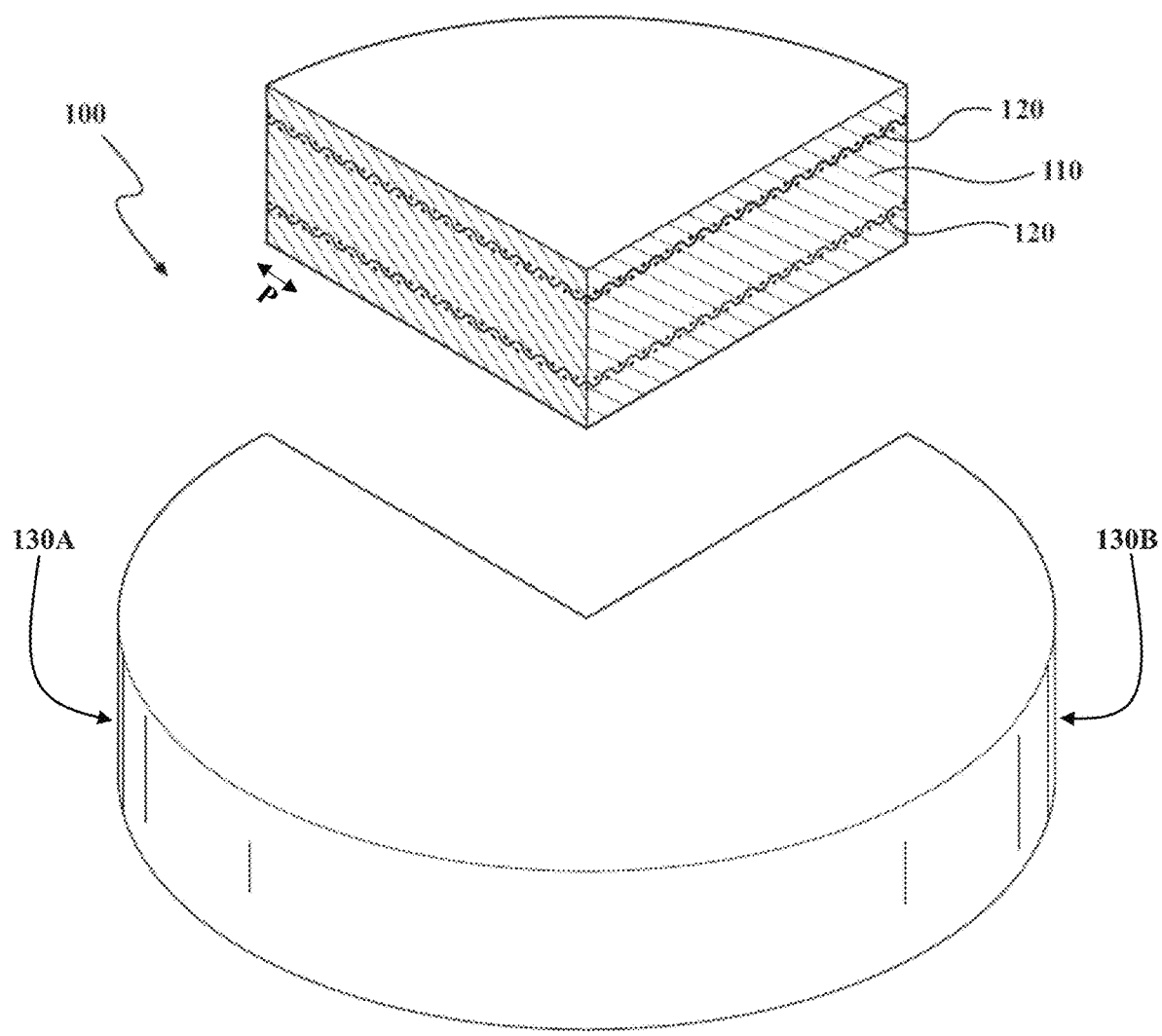
FIG. 1A is cross section of composite steel having a steel matrix with two layers of reinforcing carbon fiber.

With reference to FIG. 1A, a carbon fiber reinforced steel matrix composite (CF-SMC) 100 includes a continuous steel matrix 110 and at least one reinforcing carbon fiber 120 that is at least partially encapsulated within the steel matrix. As shown, the reinforcing carbon fiber 120 can be provided as a layer of fabric, cloth, weave, woven yarn, etc. In other instances, the reinforcing carbon fiber 120 can be provided as a fiber, yarn, or a plurality of aligned fibers.

The continuous steel matrix 110 generally includes sintered steel nanoparticles, and compositionally includes an alloy of at least, iron and carbon. The continuous steel matrix 110 can optionally include any, several, or all, of: manganese, nickel, chromium, molybdenum, boron, titanium, vanadium, tungsten, cobalt, niobium, phosphorus, sulfur, and silicon. Relative ratios of the various elemental components of the steel matrix 110 can depend on the desired application, and will generally be selectable based on common knowledge to one of skill in the art. For example, an application requiring stainless steel can include chromium present at greater than or equal to 11%, by weight, of the total weight. In one disclosed Example, the steel matrix consists of iron, carbon, and manganese present at 99.08%, 0.17%, and 0.75%, respectively, by weight of the steel matrix. It will be understood that the term "weight" as used here is interchangeable with the term "mass".

In some implementations, the term "continuous", as used in the phrase, "continuous steel matrix 110" can mean that the steel matrix is formed as, or is present as, a unitary, integral body. In such implementations, and as a negative example, a structure formed of two distinct steel bodies held together such as with an adhesive or with a weld would be discontinuous. In some implementations, the term "continuous" as used herein can mean that a continuous steel matrix 110 is substantially compositionally and structurally homogeneous throughout its occupied volume. For simplicity, the continuous steel matrix 110 will be alternatively referred to herein as "steel matrix 110", i.e. the word "continuous" will at times be omitted without changing the meaning.

In some implementations of the CF-SMC 100, the at least one reinforcing carbon fiber 120 can be fully encapsulated within the continuous steel matrix 110. In various implementations, the expression, "encapsulated within the continuous steel matrix 110" can mean that the at least one reinforcing carbon fiber 120 is, partially or fully: encased in, enclosed in, enveloped in, integrated into, or otherwise contactingly surrounded by, the continuous steel matrix 110. In some implementations, the expression, "encapsulated within the continuous steel matrix 110" can mean that at least a portion of individual fibers comprising the at least one reinforcing carbon fiber 120 are contactingly surrounded by the continuous steel matrix 110. In some implementations, the expression, "encapsulated within the continuous steel matrix 110" can mean that the continuous steel matrix 110 is, partially or fully: formed around or otherwise contactingly disposed around the at least one reinforcing carbon fiber 120.

In some implementations, the expression stating that the at least one reinforcing carbon fiber 120 is "encapsulated within the steel matrix" means that the steel matrix 110 is formed around and within the reinforcing carbon fiber 120 with sufficiently high contact between surfaces of the steel matrix 110 and surfaces of the reinforcing carbon fiber 120 to hold the reinforcing carbon fiber 120 in place relative to the steel matrix 110. In some implementations, the expression stating that the reinforcing carbon fiber 120 is "encapsulated within the steel matrix" means that an interacting surface of the steel matrix 110 is presented to and bonded with all sides of individual polymer fibers that constitute the reinforcing carbon fiber 120.

In various implementations, the expression, "sufficiently high contact between surfaces of the steel matrix and surfaces of the reinforcing carbon fiber to hold the reinforcing carbon fiber in place relative to the steel matrix can mean that at least 50%, or at least 60%, or at least 70% or at least 80%, or at least 90% of the surface area of the reinforcing carbon fiber 120 is contacted by the steel matrix.

In general, the CF-SMC 100 will have a total density that is less than the density of pure steel. For example, mild steel such as AISI grades 1005 through 1025 has a density of about 7.88 g/cm$^3$. In contrast, an exemplary CF-SMC 100 of the present disclosure has a density of 4.8 g/cm$^3$, about 61% of the density of mild steel. In comparison to this, recently developed steel-aluminum alloys have a density approximately 87% that of mild steel.

While FIG. 1A illustrates a CF-SMC 100 having two layers of reinforcing carbon fiber 120 encapsulated within the steel matrix 110, it is to be understood that the composite material can include any number of layers of reinforcing carbon fiber 120 greater than or equal to one. Stated alternatively, the at least one reinforcing carbon fiber 120 can, in some implementations, include a plurality of mutually contacting or spatially separated layers of reinforcing carbon fiber. It is further to be understood that the weight ratio of reinforcing carbon fiber 120 to steel matrix 110 within the CF-SMC 100 can be substantially varied, and that such variation will have a direct influence on the density of the CF-SMC 100 given the considerably different densities of various polymers, such as aromatic polyamides (about 2.1 g/cm$^3$), and steel.

Thus, in some implementations, a CF-SMC 100 of the present disclosure will have density less than 7 g/cm$^3$. In some implementations, a CF-SMC 100 of the present disclosure will have density less than 6 g/cm$^3$. In some implementations, a CF-SMC 100 of the present disclosure will have density less than 5 g/cm$^3$.

Figure 1B:
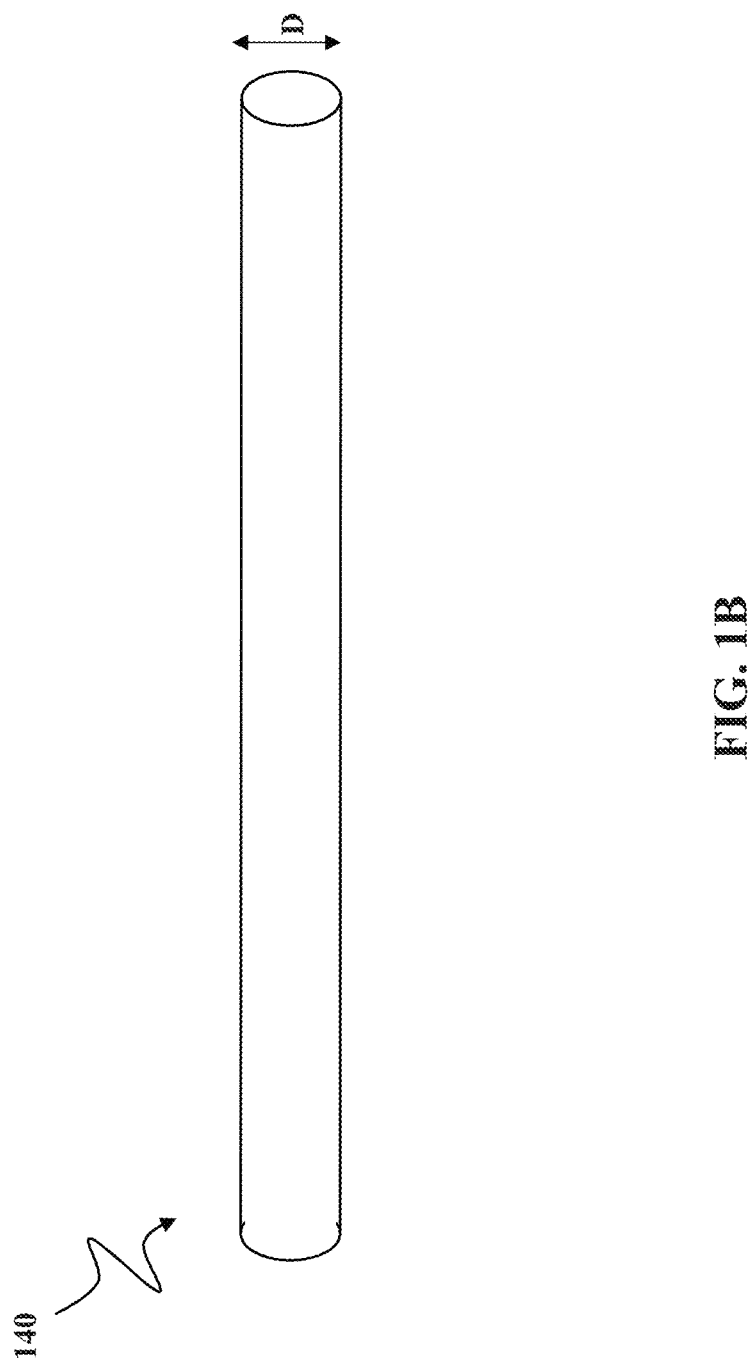
FIG. 1B is a perspective view of a portion of a carbon fiber.

FIG. 1B shows a perspective view of a portion of an exemplary carbon fiber 140 such as can constitute a portion of the at least one structural carbon fiber of the present teachings. In many implementations, the at least one structural carbon fiber can include fibers 140 having an average cross-sectional diameter, D. This includes weaves or fabrics formed of fibers 140. In many such implementations, the average cross-sectional diameter can be less than about 5 mm, or less than about 1 mm, or less than about 0.5 mm, or less than about 0.1 mm. With reference to FIG. 1A, in various implementations, the at least one structural carbon fiber can penetrate the steel matrix to a minimum depth (referred to herein as a "penetration depth"), P, as measured from an outer surface of the steel matrix. In various implementations, the penetration depth can be at least about 1 cm, or at least about 5 cm, or at least about 10 cm. Thus, carbon fiber penetration in the steel matrix can be described as having a length-to-width ratio, defined as the ratio of penetration depth to fiber diameter. In various implementations, the carbon fiber penetration length-to-width ratio can be greater than about 200:1; or greater than about 10$^3$:1; or greater than about 10$^4$:1; or greater than about 10$^5$:1. In some implementations, the structural carbon fiber will traverse substantially the entirety of the steel matrix in at least one dimension, from one surface 130A to an opposing surface 130B.

It will be understood that carbon fiber-reinforced steel composites made by methods other than those of the type discussed below will not be able to achieve such penetration dimensions of fiber diameter and penetration depth. For example, an attempt to impregnate a preformed, porous steel matrix with liquid (e.g. dissolved) carbon fiber will not achieve penetration depth or length-to-width ratio such as that described above, as capillary action will be insufficient to overcome viscous resistance to deep penetration, and carbon fiber penetration will thus be limited to sub-centimeter depth.

Figure 2:
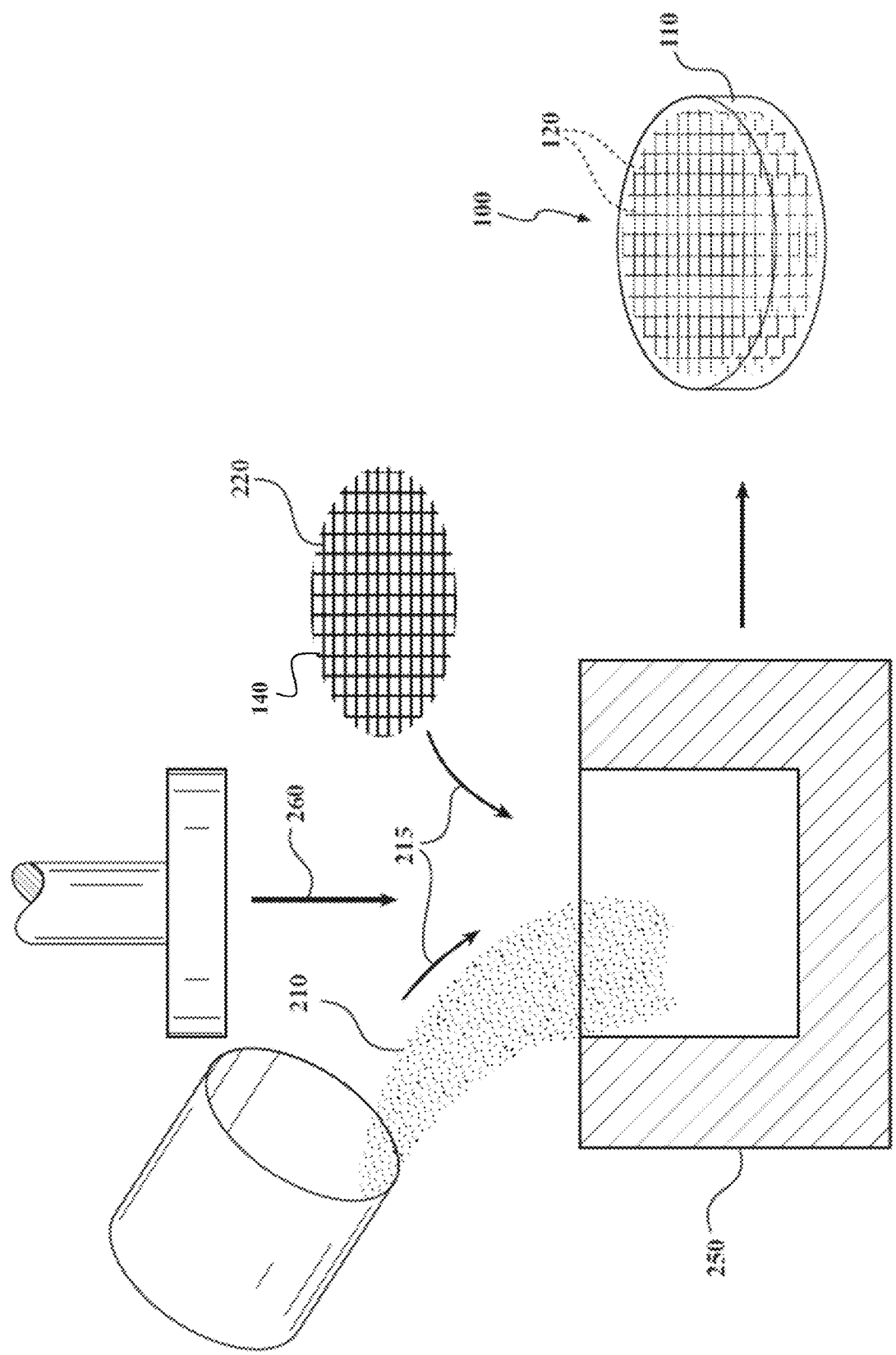
FIG. 2 is a pictorial view of a portion of a method for forming a composite material of the type shown in FIG. 1A.

Also disclosed is a method for forming a CF-SMC 100. With reference to FIG. 2, the method includes a step of providing steel nanoparticles 210. The term "steel nanoparticles 210" refers generally to a sample consisting predominantly of particles of steel having an average maximum dimension less than 100 nm. Individual particles of the steel nanoparticles 210 will generally consist of any alloy as compositionally described above with respect to the steel matrix 110 of the CF-SMC 100. As such, individual particles of the steel nanoparticles 210 will generally include iron and carbon; and can optionally include any, several, or all, of: manganese, nickel, chromium, molybdenum, boron, titanium, vanadium, tungsten, cobalt, niobium, phosphorus, sulfur, and silicon.

As described above with respect to the steel matrix 110 of a CF-SMC 100, relative ratios of the various elemental components of the steel nanoparticles 210 can depend on the desired application, and will generally be selectable based on common knowledge to one of skill in the art. In a disclosed Example, the individual particles of the steel nanoparticles 210 consist of iron, carbon, and manganese present at 99.08%, 0.17%, and 0.75%, respectively, by weight.

In various aspects, the average maximum dimension of the steel nanoparticles 210 can be determined by any suitable method, including but not limited to, x-ray diffraction (XRD), Transmission Electron Microscopy, Scanning Electron Microscopy, Atomic Force Microscopy, Photon Correlation Spectroscopy, Nanoparticle Surface Area Monitoring, Condensation Particle Counter, Differential Mobility Analysis, Scanning Mobility Particle Sizing, Nanoparticle Tracking Analysis, Aerosol Time of Flight Mass Spectroscopy, or Aerosol Particle Mass Analysis.

In some implementations, the average maximum dimension will be an average by mass, and in some implementations will be an average by population. In some instances, the steel nanoparticles 210 can have an average maximum dimension less than about 50 nm, or less than about 40 nm, or less than about 30 nm, or less than about 20 nm, or less than about 10 nm.

In some aspects, the average maximum dimension can have a relative standard deviation. In some such aspects, the relative standard deviation can be less than 0.1, and the steel nanoparticles 210 can thus be considered monodisperse.

With continued reference to FIG. 2, the method for forming CF-SMC 100 additionally includes a step of combining 215 the steel nanoparticles 210 with a reinforcing carbon fiber component 220 to produce an unannealed combination. The reinforcing carbon fiber component 220 is in all respects identical to the reinforcing carbon fiber 120 as described above with respect to a CF-SMC 100, with the exception that the reinforcing carbon fiber component 220 is not yet integrated into, or encapsulated within, a steel matrix 110 as defined above. Thus, the reinforcing carbon fiber component 220 can include, for example, carbon fibers formed in any configuration designed to impart tensile strength in at least one dimension, in some aspects in at least two-dimensions.

In many implementations, the combining step 215 will include sequentially combining at least one layer of steel nanoparticles 210 and at least one layer of reinforcing carbon fiber component 220, such that the unannealed combination consists of one or more layers each of steel nanoparticles 210 and reinforcing carbon fiber component 220. Any number of layers of steel nanoparticles 210 and any number of layers of reinforcing carbon fiber component 220 can be employed. It will be understood that in implementations where reinforcing carbon fiber 120 is desired at an exterior surface of the CF-SMC 100, a reinforcing carbon fiber component 220 will be the first and/or last sequentially layered component in the unannealed combination; and in implementations were reinforcing carbon fiber 120 is desired between exterior surfaces of the CF-SMC 100, a layer of reinforcing carbon fiber component 220 will be preceded and followed by a layer of steel nanoparticles 210.

The combining step 215 will generally include combining the steel nanoparticles 210 and the reinforcing carbon fiber component 220 within a die, cast, mold, or other shaped structure having a void space corresponding to the desired shape of the CF-SMC 100 to be formed. In some particular implementations, the at least one layer of steel nanoparticles 210 and the at least one layer of reinforcing carbon fiber component 220 will be combined within a heat press die 250.

In some implementations, the method for forming CF-SMC 100 can include a step of manipulating steel nanoparticles 210 in the unannealed combination into interstices in the reinforcing carbon fiber component 220. Such a manipulating step can be effective to maximize surface area of contact between steel nanoparticles 210 and the reinforcing carbon fiber component 220 in the unannealed combination, improving the effectiveness of integration of the reinforcing carbon fiber 120 into the steel matrix 110 of the eventually formed CF-SMC 100. Manipulating steel nanoparticles 210 into interstices in the reinforcing carbon fiber component 220 can be accomplished by any procedure effective to increase surface area of contact between steel nanoparticles 210 and reinforcing carbon fiber component 220, including without limitation: pressing, agitating, shaking, vibrating, sonicating, or any other suitable procedure.

The method for forming CF-SMC 100 additionally includes a step of sintering the steel nanoparticles 210, converting the steel nanoparticles 210 into a steel matrix 110 such that the reinforcing carbon fiber component 220 becomes reinforcing carbon fiber 120 integrated into the steel matrix 110; and thus converting the unannealed combination into CF-SMC 100. The sintering step generally includes heating the unannealed combination to a temperature less than 450° C. and sufficiently high to sinter the steel nanoparticles 210. In some implementations, the sintering step can include heating the unannealed combination to a temperature greater than 400° C. and less than 450° C. In some implementations, the sintering step can include heating the unannealed combination to a temperature greater than 420° C. and less than 450° C.

In some implementations, the sintering step can be achieved by hot compaction, i.e. by applying elevated pressure 260 simultaneous to the application of elevated temperature. In some implementations employing hot compaction, the elevated pressure can be at least 30 MPa; and in some implementations, the elevated pressure can be at least 60 MPa. Depending on the sintering conditions of temperature and pressure, the duration of the sintering step can vary. In some implementations, the sintering step can be performed for a duration within a range of 2-10 hours, and in one disclosed Example is performed for a duration of 4 hours.

The carbon fiber reinforced steel matrix composite (CF-SMC) is made by charging a die with alternating layers of steel powder and carbon fiber cloth. The steel powder used can be nanoparticles, <45 micron powder, or a mixture of the two size regimes. The weave of the carbon fiber cloth is loose enough to allow penetration between the fibers so that the steel matrix around the reinforcement is allowed to be continuous after consolidation.

The carbon fiber cloth and steel powder are assembled in the die under an inert atmosphere (inside an argon glove box) to prevent oxidized surfaces from forming. The final punch and die assembly is then compacted at 800° C. with 60 MPa of pressure for 1 hour, under an argon flow.

The carbon fiber has a lower density than steel (by a factor of ~3.75) and has a higher tensile strength. Addition of multiple carbon fiber layers to the steel matrix lowers the weight of the final composite (as a function of the lower carbon fiber density) and increases the tensile strength as a function of its contribution to the mechanical strength of the composite.

It will be appreciated that in some instances, providing steel nanoparticles 210 having a desired composition, average maximum dimension, and/or relative standard deviation of the average maximum dimension may be difficult to achieve by conventional methods. For example, "top down" approaches involving fragmentation of bulk steel into particulate steel via milling, arc detonation, or other known procedures will often provide steel particles that are too large and/or too heterogeneous for effective sintering into a uniform, robust steel matrix 110. "Bottom up" approaches, such as those involving chemical reduction of dissolved cations, will often be unsuitable for various alloy nanoparticles due to incompatible solubilities, or even unavailability, of the relevant cations. For example, cationic carbon, that is suitable for chemical co-reduction with cationic iron to form steel, may be difficult to obtain. Further, even where these techniques or others may be effective to produce steel nanoparticles 210 of a given composition at laboratory scale, scale up may prove unfeasible or uneconomical.

For these reasons, the step of providing steel nanoparticles 210 can in many implementations be performed by a novel steel nanoparticle 210 synthesis using Anionic Element Reagent Complexes (AERCs). An AERC generally is a reagent consisting of one or more elements in complex with a hydride molecule, and having a formula:

$$Q^0 \cdot X_y \quad \text{Formula I,}$$

wherein $Q^0$ represents a combination of one or more elements, each formally in oxidation state zero and not necessarily in equimolar ratio relative to one another; X represents a hydride molecule, and y is an integral or fractional value greater than zero. An AERC of Formula I can be formed by ball-milling a mixture that includes: (i) powders of each of the one or more elements, present at the desired molar ratios; and (ii) a powder of the hydride molecule, present at a molar ratio relative to the combined one or more elements that corresponds to y. In many implementations, the hydride molecule will be a borohydride, and in some specific implementations the hydride molecule will be lithium borohydride.

Contacting an AERC of Formula I with a suitable solvent and/or ligand molecule will result in formation of nanoparticles consisting essentially of the one or more elements, the one or more elements being present in the nanoparticles at ratios equivalent to which they are present in the AERC.

Thus, an AERC suitable for use in steel nanoparticle 210 synthesis generally has a formula:

  Formula II, where Fe is elemental iron, formally in oxidation state zero; C is elemental carbon, formally in oxidation state zero; M represents one or more elements in oxidation state zero, each of the one or more elements selected from a group including Mn, Ni, Cr, Mo, B, Ti, V, W, Co, Nb, P, S, and Si; X is a hydride molecule as defined with respect to Formula I; a is a fractional or integral value greater than zero; b is a fractional or integral value greater than zero; d is a fractional or integral value greater than or equal to zero; and y is a fractional or integral value greater than or equal to zero. It will be appreciated that the values of a, b, and c will generally correspond to the molar ratios of the various components in the desired composition of steel. It is further to be understand that M and d are shown as singular values for simplicity only, and can correspond to multiple elements present at non-equimolar quantities relative to one another. An AERC of Formula II can alternatively be referred to as a steel-AERC.

Formation of a steel-AERC can be accomplished by ball-milling a mixture that includes: (I) a powder of a hydride molecule, such as lithium borohydride; and (II) a pre-steel mixture that includes (i) iron powder; (ii) carbon powder; and (iii) optionally, powder(s) of one or more elements selected from a group including Mn, Ni, Cr, Mo, B, Ti, V, W, Co, Nb, P, S, and Si. This mixture is to include iron powder, carbon powder, and optional powder(s) of one or more selected elements, at weight ratios identical to the weight ratios of these various components in a desired steel product. For example, in order to synthesis a stainless steel type 316 product having, by weight, 12% Ni, 17% Cr, 2.5% Mo, 1% Si, 2% Mn, 0.08% C, 0.045% P, and 0.03 S, the pre-steel mixture, to be combined with powder of a hydride molecule for ball milling, should include powders of each of these elements present in the listed percentages by weight.

Thus, in some implementations, a disclosed process for synthesizing steel nanoparticles includes a step of contacting a steel-AERC, such as one defined by Formulae I or II, with a solvent. In some implementations, the disclosed process for synthesizing steel nanoparticles includes a step of contacting a steel-AERC, such as one defined by Formulae I or II, with a ligand. In some implementations, the disclosed process for synthesizing steel nanoparticles includes a step of contacting a steel-AERC, such as one defined by Formulae I or II, with a solvent and a ligand. Contacting a steel-AERC with a suitable solvent and/or ligand will result in formation of steel nanoparticles 210 having alloy composition dictated by the composition of the steel-AERC, and thus by the composition of the pre-steel mixture from which the steel-AERC was formed.

Non-limiting examples of suitable ligands can include nonionic, cationic, anionic, amphoteric, zwitterionic, and polymeric ligands and combinations thereof. Such ligands typically have a lipophilic moiety that is hydrocarbon based, organosilane based, or fluorocarbon based. Without implying limitation, examples of types of ligands which can be suitable include alkyl sulfates and sulfonates, petroleum and lignin sulfonates, phosphate esters, sulfosuccinate esters, carboxylates, alcohols, ethoxylated alcohols and alkylphenols, fatty acid esters, ethoxylated acids, alkanolamides, ethoxylated amines, amine oxides, nitriles, alkyl amines, quaternary ammonium salts, carboxybetaines, sulfobetaines, or polymeric ligands. In some particular implementations, a ligand can be at least one of a nitrile, an amine, and a carboxylate.

Non-limiting examples of suitable solvents can include any molecular species, or combination of molecular species, capable of interacting with the constituents of an AERC by means of non-bonding or transient-bonding interactions. In different implementations, a suitable solvent for synthesis of steel nanoparticles 210 from a steel-AERC can be a hydrocarbon or aromatic species, including but not limited to: a straight-chain, branched, or cyclic alkyl or alkoxy; or a monocyclic or multicyclic aryl or heteroaryl. In some implementations, the solvent will be a non-coordinating or sterically hindered ether. The term solvent as described can in some variations include a deuterated or tritiated form. In some implementation, a solvent can be an ether, such as THF.

The present invention is further illustrated with respect to the following examples. It needs to be understood that these examples are provided to illustrate specific embodiments of the present invention and should not be construed as limiting the scope of the present invention.

Example 1. Steel Nanoparticle Synthesis

To a ball mill jar is added 0.0136 g carbon, 0.06 g manganese, 7.9264 g iron, and 6.28 g lithium borohydride. This is ball-milled under an inert atmosphere for 4 hours. The steel-AERC product is washed with THF, resulting in formation of steel nanoparticles having a composition 99.08% Fe, 0.17% C, and 0.75% Mn. The formed steel nanoparticles are isolated.

Example 2. Formation of Composite Steel

The steel nanoparticles of Example I are loaded into a punch and die with dispersed layers of a weave of carbon fibers. The steel nanoparticle powder is encouraged into the gaps between fibers of the weave of carbon fibers during this loading step. The material is then sintered at 430° C. and 60 MPa for 4 hours. The product is a composite steel having reinforcing carbon fiber integrated into a steel matrix as illustrated in FIGS. 1 and 2.

The foregoing description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure; various steps may be performed independently or at the same time unless otherwise noted. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment is included in at least one embodiment or aspect. The appearances of the phrase "in one aspect" (or variations thereof) are not necessarily referring to the same aspect or embodiment.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A composite material comprising:
    a continuous steel matrix consisting essentially of sintered steel nanoparticles sintered at a temperature less than 450° C.; and
    at least one structural carbon fiber encapsulated within the continuous steel matrix, the at least one structural carbon fiber having an average cross-sectional fiber diameter less than about 5 mm,
    wherein the at least one structural carbon fiber penetrates the continuous steel matrix to a penetration depth, as measured from an outer surface of the continuous steel matrix, of at least 1 cm.

2. The composite material as recited in claim 1, wherein the structural carbon fiber is provided in the form or a carbon fiber cloth or a carbon fiber weave.

3. The composite material as recited in claim 1, wherein a ratio of fiber penetration depth to fiber average cross-sectional diameter is greater than about 200:1.

4. The composite material as recited in claim 1, wherein a ratio of fiber penetration depth to fiber average cross-sectional diameter is greater than about $10^3$:1.

5. The composite material as recited in claim 1, wherein a ratio of fiber penetration depth to fiber average cross-sectional diameter is greater than about $10^4$:1.

6. The composite material as recited in claim 1, wherein a ratio of fiber penetration depth to fiber average cross-sectional diameter is greater than about $10^5$:1.

7. The composite material as recited in claim 1, wherein the at least one structural carbon fiber comprises fibers having an average cross-sectional diameter less than about 1 mm.

8. The composite material as recited in claim 1, wherein the at least one structural carbon fiber comprises fibers having an average cross-sectional diameter less than about 0.5 mm.

9. A composite material comprising:
    a structural carbon fiber component comprising fibers having an average cross-section diameter less than about 1 millimeter; and
    a continuous steel matrix consisting essentially of sintered steel nanoparticles sintered at a temperature less than 450° C. and formed around and within the structural carbon fiber component,
    wherein, the structural carbon fiber component penetrates the continuous steel matrix to a fiber penetration depth, as measured from an outer surface of the continuous steel matrix, of at least 1 centimeter.

10. The composite material as recited in claim 9, wherein a ratio of fiber penetration depth to fiber average cross-sectional diameter is greater than about 200:1.

11. The composite material as recited in claim 9, wherein a ratio of fiber penetration depth to fiber average cross-sectional diameter is greater than about $10^3$:1.

12. The composite material as recited in claim 9, wherein a ratio of fiber penetration depth to fiber average cross-sectional diameter is greater than about $10^4$:1.

13. The composite material as recited in claim 9, wherein a ratio of fiber penetration depth to fiber average cross-sectional diameter is greater than about $10^5$:1.

14. The composite material as recited in claim 9, wherein the structural carbon fiber component comprises fibers having an average cross-sectional diameter less than about 0.5 mm.

* * * * *